Patented Apr. 8, 1941

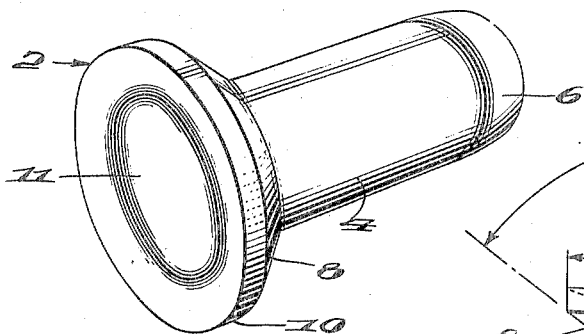
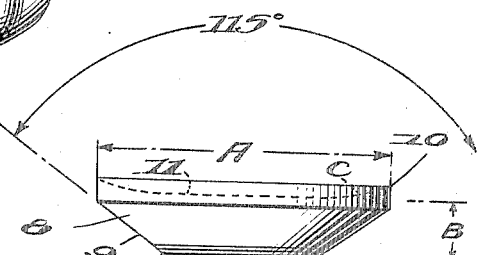
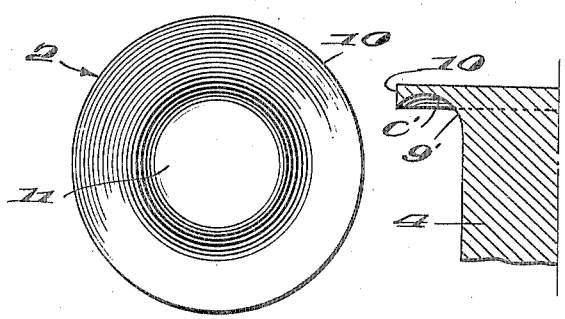
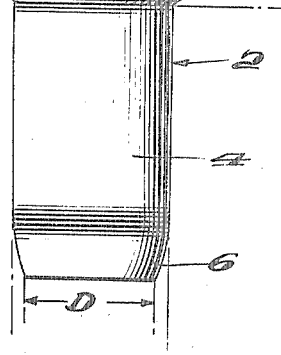
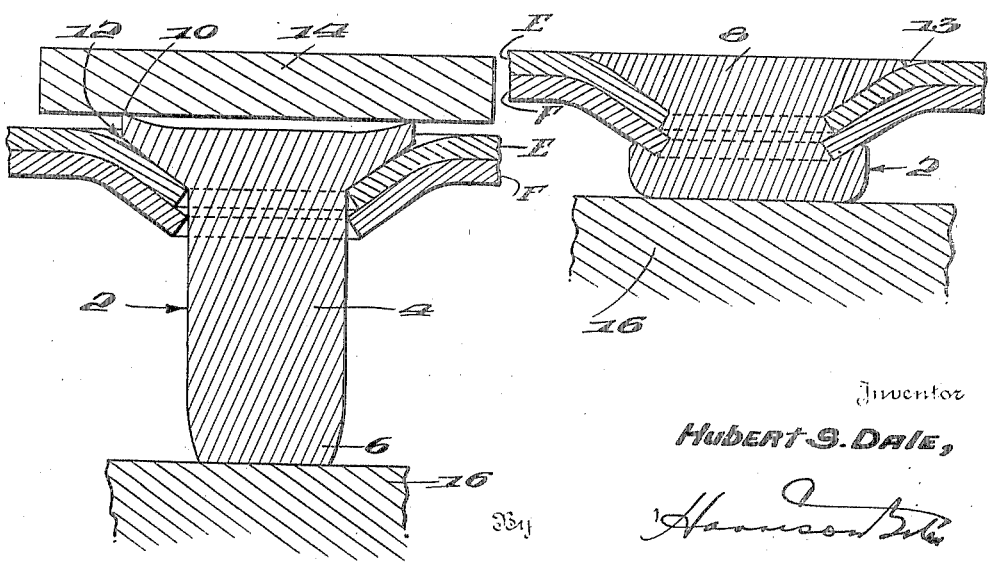

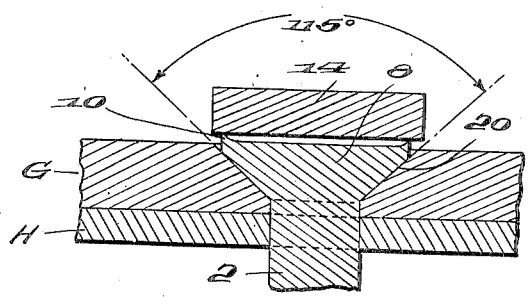
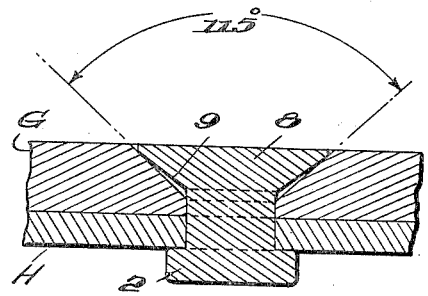
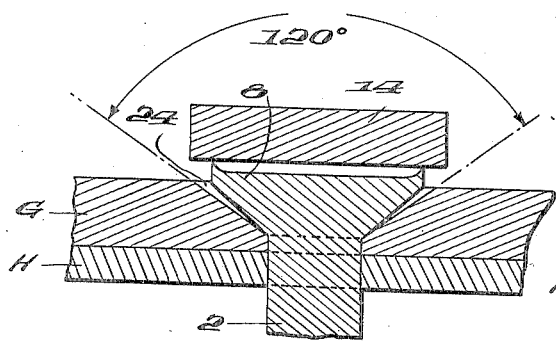
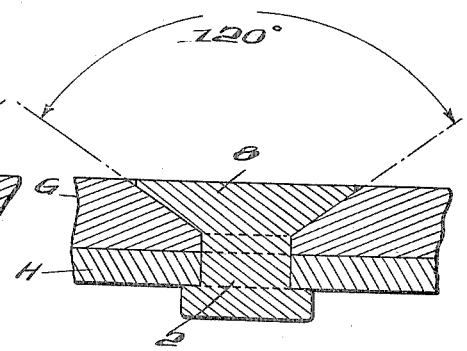
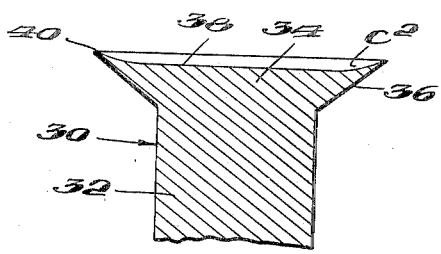

2,237,338

UNITED STATES PATENT OFFICE 2,237,338

RIVET

Hubert S. Dale, Middle River, Md., assignor to The Glenn L. Martin Company, Baltimore, Md.

Application February 20, 1939, Serial No. 257,503

5 Claims. (Cl. 85—37)

This invention is directed to a rivet, and more particularly to a rivet adapted to form a flush surface with the surface through which the rivet is passed.

In the prior art, rivets have been made which, after being secured, have their heads projecting above the supporting surface. Counter-sinking or other means of making the rivet head flush with the supporting surface is very desirable, but has been difficult to obtain satisfactorily when riveting thin lightweight metal sheets.

In the riveting together of light sheet metal sheets, such as are used in aircraft work, rivet holes are drilled through the overlapping sheets, and a rivet having a head with a conical under-surface is placed in each hole. When the rivet is driven, the metal sheets are deformed, and the head is seated in the depression or dimple formed in the surface of the sheet beneath the rivet head. In such construction, the rivet head neither fills the whole depression made in the surface of the sheet, nor makes an entirely tight connection between the under-surface of the rivet head and the metal sheet. An uneven surface across the joint results, and leakage through the joint of liquid accumulating in the depression occurs by seepage beneath the rivet head. Furthermore, closely spaced rivets, under the riveting operation, cause the metal in the sheets between the rivets to buckle, which buckling is not relieved when the riveting is completed. Such buckling causes the overlapped sheets to separate slightly between the rivets so that a liquid-tight joint between the sheets cannot be obtained.

It is an object of this invention to produce a rivet which is adapted to have its head recessed into the supporting surface to produce a continuous unbroken surface including the supporting surface and the upper surface of the rivet head.

A further object is to produce a rivet which has a malleable head deformable to produce a flush surface with the supporting surface.

A further object of the invention is to produce a rivet head which, when recessed into a supporting surface, not only produces a surface flush with the supporting surface, but further produces a sealed tight joint so that corrosive liquids cannot enter between the rivet head and the supporting surface.

A further object of the invention is to produce a small rivet adapted to be used with light-guage sheet metal, as in aircraft construction, which will produce a flush liquid-tight connection between the sheet metal and the rivet head.

A further object of the invention is to produce a rivet having a head deformable to produce a relatively great bearing area on the surface of a metal sheet, said head preventing the buckling or separation of the lapped metal sheets between adjacent rivets.

A further object of the invention is to produce a metal rivet having a deformable head adapted to be countersunk into the surface of a metal sheet, said rivet head having an under-surface inclined at a less angle than the surface of the counter-sunk bore, whereby said head can be deformed into tight surface engagement with the surface of the bore.

In general, these objects of the invention are obtained by using a rivet which has a head thickened on the periphery of either its upper surface or lower surface, which head is deformable to fill up the depression made in the surface of the sheet adjacent the hole through which the rivet is passed. When the head of the rivet is driven with a flat bar, the extra metal given the head by the thickened edge construction flows to fill the depression and thus to make a tight flush joint between the surface of the supporting sheet and the rivet, and to bring the lapped metal sheet between adjacent rivets into flat tight engagement.

A means by which the objects of this invention are obtained may be more readily understood by reference to the accompanying drawings, in which:

Fig. 1 is a perspective view of the preferred form of the rivet.

Fig. 2 is a side elevational view of the rivet.

Fig. 3 is a plan view of Fig. 2.

Fig. 4 is a partial cross-sectional view showing a modified form of the rivet.

Fig. 5 is a cross-sectional view showing the rivet about to be riveted to fasten together two thin metal sheets in which a dimple or depression has been formed beneath the rivet head.

Fig. 6 is a cross-sectional view showing the rivet in final position.

Fig. 7 is a cross-sectional view of the rivet of Figs. 1 and 2 having its head placed in a countersunk bore in a metal sheet, and before being driven.

Fig. 8 is a cross-sectional view of the rivet of Fig. 7 in its final riveted position.

Fig. 9 is a view similar to Fig. 7, but showing a modified form of rivet.

Fig. 10 is a view similar to Fig. 8, but showing the rivet of Fig. 9 in final riveted position; and Fig. 11 is a cross-sectional view of another modified form of rivet.

In Figs. 1, 2 and 3, the rivet 2 is shown having a stem 4 which is slightly reduced at its lower end at 6, and a head 8, the construction of which represents the novelty of this invention.

Head 8 has its under-surface 9 flanged outwardly from stem 4 at a dihedral angle of approximately 115°, this providing a conical or an oblique portion which is adapted to be seated in the dimpled portion or the depressed surface area adjacent the rivet hole in the metal sheet which has been drilled or reamed to receive the rivet. A vertical edge 10 forms the periphery of the head. The upper surface of the rivet head is dished or recessed at 11, thus making the edge 10 a thickened portion of the rivet head.

The normal thickness of the rivet head is illustrated by the depth B, Fig. 2. If the rivet head were of this thickness alone, the rivet head would be seated in the depression in the sheet, with the top of the rivet head flush with the surface of the sheet, but with a small annular depression 12 existing between the edge 10 of the rivet head and the surface plane of the sheet, note Fig. 5. Thickened edge 10 provides the additional metal for substantially filling this annular depression 12. From the upper peripheral edge of the rivet, the upper surface of the rivet head slopes toward the center of the rivet, the slope terminating approximately above the projection of the circumference of the stem 4. This slope is made in the form of an arc having the radius C, and is calculated to give to the rivet head an additional amount of metal sufficient to fill up the depression 12 between the edge of the undeformed rivet and the plane of the surface of the supporting sheet. Although this additional metal has been described as added metal, it is to be understood that it is added metal in the sense only of being more than that contained in the ordinary rivet. Of course, the entire rivet described is composed of one integral piece. The drawings are greatly magnified showings of the rivet. Therefore, in Fig. 6 a very small annular depression 13 is shown after the riveting operation has been completed. Actually depression 13 is so small as to be substantially imperceptible to the eye.

As shown in Fig. 4, the additional metal can be placed on the under-surface 9' of the rivet head, the same then being given the radius of C'. In this case, the upper surface of the rivet head is flat.

The driving of the rivet is shown in Figs. 5 and 6. Two plates E and F are to be riveted together. A hole has been drilled through the overlapped sheets, a depression or dimple being formed adjacent the edge of the hole in the surface of the upper sheet if the hole has been punched, and the depression being formed by driving the conical undersurface of head 8 into the sheets if the hole was drilled. Stem 4 has been inserted through the hole and the surface 9 of the rivet head rests on the depressed surface of the sheet. The head of the rivet is held in place by a flare bar 14, while the stem of the rivet is driven by a riveting tool 16. As the stem of the rivet is deformed into locking engagement with the surface of the sheet F, the head of the rivet is likewise deformed so that the additional metal given the upper surface by the thickened edge 10 flows to fill the depression 12, and make a flush surface with the surface of sheet E as shown in Fig. 6. The relatively high pressure necessary to obtain a flow of metal in the thickened edge during the riveting operation further acts to seat the rivet head more tightly in the depression. It is noted that the driving of the rivet and the deforming of the head can be done in one operation, if desired. Thus, the final surface of the rivet is substantially a continuation of the surface of the sheet E, and no hole, joint, or depression in the sheet E is to be seen, the depression 13 being negligible. The rivet makes a complete water-tight connection between the metal sheets, the head of the rivet fitting so closely to the surface of sheet E as to prevent the penetration of water or other liquids thereunder.

Normally when the sheets E and F are overlapped and then punched, the metal sheets buckle and separate between adjacent rivets, and this separation exists even after the ordinary rivets have been driven. With the new rivet of this invention, the metal flowing from the thickened edge creates an increased bearing area on the surface of sheet E, and this, coupled with the pressure necessary to bring about the flow of metal, causes the sheets E and F to be brought into tight intimate contact between adjacent rivets so that no space exists therebetween. The new rivets thus cause a liquid proof joint to be formed between sheets E and F.

The rivet described is especially adaptable for the riveting of thin lightweight metal sheets in aircraft construction in the making of fuel tanks, hulls for flying boats, and in wing and fuselage assemblies. The following table gives the actual dimensions of two sizes of rivets which have been used, these being merely examples of constructions which have been successfully used, and not being given in limitation of the scope of the invention as defined by the claims appended to this description.

| Rivet size | A | B | C | D |
|---|---|---|---|---|
| ⅛" | .257" | .045" | .110" | .092" |
| 5/32" | .320" | .057" | .164" | .118" |

In Fig. 7 the rivet 2 is shown just prior to being driven to rivet together sheets G and H, sheet G having been provided with a counter bore 20, the surface of which bears the same inclination as the under-surface 9 of rivet 2. Such inclination is given for purposes of illustration as 115°. In Fig. 8, rivet 2 is shown in final driven position. The metal in thickened edge 10 has flowed to make a flush surface with the surface of sheet G, but the surface 9 of rivet 2 has separated from the surface of bore 20 through the deformation of head 8. Consequently no tight joint is obtained between the rivet head and the metal sheet.

It has been discovered that the separation of the head from the sheet can be prevented as disclosed in Figs. 9 and 10. Sheet G has been counter-bored with a greater angle than the angle given the head, for example, the bore 24 has an angle of 120°. When the rivet is driven into place as shown in Fig. 10, head 8 deforms to fill the bore completely, and thus to make a liquid-tight strong connection between the rivet and sheet G.

In place of the rivet 2 shown in Figs. 5 to 10, or the rivet of Fig. 4, the rivet 30 of Fig. 11 can be used to achieve similar advantages and results. Rivet 30 has a stem 32 and a head 34, The under-surface 36 of the head is flared outwardly from the stem and is continued until it is tangent to the upper surface 38 of head 34, said surface 38 being given a radius $C^2$ adjacent its periphery. A feathered edge 40 is thus formed. The metal lying between the plane of the flat portion of surface 38 and the edge 40 is the thickened edge portion which is extruded as shown for the edge 10 of rivet 2.

Various sized rivets and various dimensions may be employed to fit the particular type of sheets to be riveted together. The outstanding feature of the rivet is that the head is given a thickened edge to provide additional metal which can be extruded during the riveting operation to fill the depression in the top of the metal sheet to make a tight joint for the rivet head, and for the overlapped sheets, and to give an increased strength giving bearing surface for the rivet head. The rivet may be made of any malleable metal, it being noted that lightweight aluminum alloys are conveniently employed in aircraft construction. Besides the advantages obtaining a liquid-tight seal between the sheets, an additional advantage is obtained in the flush surface construction for aircraft work as the parasite resistance of a projecting rivet head is eliminated, this being especially valuable for high speed aircraft construction.

An especial advantage lies in the greater surface area contact between the rivet head and the metal sheet, this creating a stronger than ordinary joint. This is especially valuable in the riveting of thin metal sheets as failure normally occurs by one sheet tearing away from the rivet.

Having now described a means by which the objects of this invention are obtained, what is claimed is:

1. A rivet adapted to be flush riveted into the surface of a supporting sheet comprising a stem, a head flared outwardly in the shape of a truncated cone from and attached to said stem, said head having a thickened edge portion extending above the upper surface of said head, and said edge portion being adapted to be extruded into a flush extension of the surface of said head.

2. A rivet comprising a stem and a head of greater diameter than said stem attached to one end of and projecting outwardly of said stem, said head having an under-surface tapering toward said stem and having a dished upper surface.

3. In the combination of lapped metal sheets and a rivet the stem of which extends through said sheets, and the head of which has an undersurface outwardly flared from said stem and seated in a depression in the surface of one of said sheets, with the top of the rivet flush with the sheet surface, said undersurface of said rivet being in full conforming contact with the surface of said depression, and said head substantially filling said depression by the extrusion of metal from the periphery of a dished surface rivet head.

4. In the combination of claim 3, said depression comprising a conically shaped countersink in said sheet surface, the dihedral angle of which is greater than the dihedral angle of the flared undersurface of said rivet head before deformation.

5. In the combination of claim 3, said depression comprising a conically shaped countersink in said sheet surface, the dihedral angle of which is of the order of five degrees greater than the dihedral angle of the flared undersurface of said rivet head before deformation.

HUBERT S. DALE.